Patented Feb. 26, 1924.

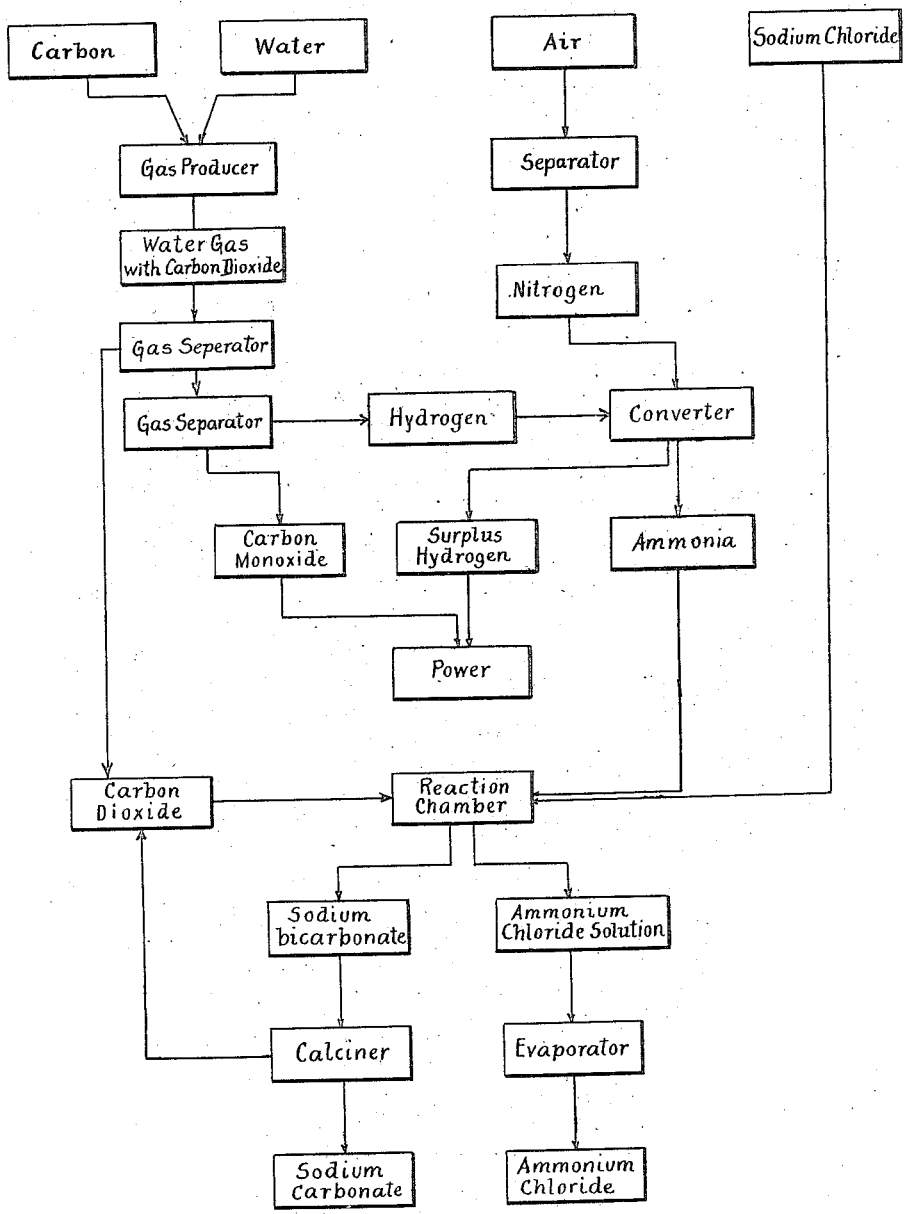

1,484,932

UNITED STATES PATENT OFFICE.

GEORGES CLAUDE, OF PARIS, FRANCE, ASSIGNOR TO L'AIR LIQUIDE, SOCIETE ANONYME POUR L'ETUDE ET L'EXPLOITATION DES PROCEDES GEORGES CLAUDE, OF PARIS, FRANCE.

PROCESS OF SIMULTANEOUSLY PREPARING AMMONIUM CHLORIDE AND SODIUM CARBONATE EMPLOYING SYNTHETIC AMMONIA.

Application filed March 14, 1918. Serial No. 222,506.

*To all whom it may concern:*

Be it known that I, GEORGES CLAUDE, a citizen of France, residing at Paris, France, have invented certain new and useful Improvements in processes of simultaneously preparing ammonium chloride and sodium carbonate employing synthetic ammonia; and I do hereby declare the following to be a full, clear, and exact description of the invention, such as will enable others skilled in the art to which it appertains to make and use the same.

This invention relates to a process for the production of ammonium chloride and sodium carbonate from common and readily obtainable materials such as carbon, water, air and sodium chloride and has particular reference to the conversion of ammonia produced synthetically into a solid product, ammonium chloride, which is readily applicable as a fertilizer and is easily transported.

The fixation of atmospheric nitrogen and its application as a fertilizer has long engaged the interest of investigators, and nitrogen fixation now approaches a position which insures the practicable production of ammonia in large quantities and at a relatively low cost. The ammonia produced is in the form of a liquid or solution which is not readily adapted for use in agriculture and there remains, therefore, the desirability of converting the ammonia in some inexpensive and satisfactory manner into a solid product. Sulfuric acid may be employed to convert the ammonia into the sulfate, but the sulfuric acid is relatively expensive, and has no value as a fertilizer.

It is the object of the present invention, therefore, to provide a simple and inexpensive process whereby nitrogen derived from the atmosphere may be combined with hydrogen to form ammonia, which is, in turn, caused to react with sodium chloride in the presence of carbon dioxide to provide ammonium chloride and in addition valuable commercial product, sodium carbonate, all of the required materials being relatively inexpensive and available in practically unlimited quantity and the various reactions being directed to provide the necessary reagents as well as the power utilizable in carrying on the process.

Further objects and advantages of the invention will be apparent as it is better understood by reference to the following specification when read in connection with the accompanying drawing which illustrates a flow sheet indicating the various steps of the process in their proper succession.

The nitrogen necessary for the reaction may be readily recovered from the atmosphere by well known processes, for example, liquefaction and rectification of the liquid air. The nitrogen recovered is of sufficient purity to permit its combination with hydrogen synthetically when the gases are mixed and heated in the presence of a suitable catalyzing agent.

It becomes necessary to provide a suitable source of hydrogen and this, in accordance with the invention, is water gas produced in the well known manner from carbon and steam in a suitable apparatus. The production of water gas is governed by one or the other of the following equations, either of which may preponderate according to the conditions of temperature prevailing:

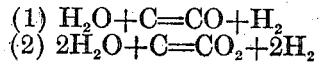

(1) $H_2O + C = CO + H_2$
(2) $2H_2O + C = CO_2 + 2H_2$

The second equation which may also be carried out by working according to the first and catalyzing the mixture obtained with water vapor, is obviously of greater interest when one has in view solely the production of hydrogen, since the same quantity of carbon produces double the quantity of hydrogen. The hydrogen is, however, accompanied by incombustible carbon dioxide instead of by combustible carbon monoxide. In the present instance the process requires considerable motive power and this motive power can, in many instances, be best obtained from carbon. It would be necessary, if working in accordance with the second equation, to manufacture for the motive power, a supplementary quantity of water gas with the disadvantage that if this supplementary gas is supplied by the same reaction, it is too rich in hydrogen to be suitable for use in gas engines. However, if one is in possession of a simple process for eliminating carbon monoxide from a gaseous mixture, such, for instance, as the process described in the co-pending application of Georges Claude, Serial No. 222,505, filed March 14, 1918, involving solution of the carbon monoxide under pressures ranging from 50 to 300 atmospheres, then it is preferable to operate the gas producer in such a manner that the quantity of carbon monoxide produced in the water gas generator plus that of hydrogen which escapes combination with the nitrogen in the subsequent production of synthetic ammonia, is just sufficient to supply the necessary motive power.

Consequently the gaseous mixture from the gas producer must contain in addition to hydrogen and the amount of carbon monoxide specified, a certain portion of carbon dioxide which is utilized as hereinafter described. The gaseous mixture obtained will be subjected to a process of separation of hydrogen described in the above mentioned application, Serial No. 222,505, and for this purpose it must be compressed to a pressure higher than 50 atmospheres and is generally cooled to a rather low temperature, possibly as low as $-30$ to $-40°$ C. Under the combined effect of the high pressure and low temperature, the carbon dioxide, if present in sufficient proportions, will appear in a liquid form and may be separated in a cooled vessel, and drawn out in a suitable container such as the bottles usually employed for its storage or recovered as snow which is directly utilizable in the form of cakes. The evaporation of the solid carbon dioxide in large masses will be very slow, that is to say, whether the carbon dioxide is stored as a liquid or as a solid, it is adapted for ultimate utilization under pressure.

It will be possible to utilize this carbon dioxide for the purpose of the contemplated reaction between ammonia and sodium chloride, but instead of obtaining carbon dioxide by proceeding, as indicated, to operate the gas producer so that the reactions are intermediate between (1) and (2) as indicated, a mixture of carbon monoxide and hydrogen may be produced according to equation (1) and the mixture may be subsequently subjected to catalysis with water vapor to thereby produce carbon dioxide; this last gas will be easily separated by dissolving under pressure in water and recovered by releasing the pressure on the water which has dissolved the gas.

Having thus separated carbon dioxide and carbon monoxide from the water gas, the residue is hydrogen suitable for the synthetic production of ammonia by combination with the nitrogen recovered from air. The two gases are, therefore, brought together, preferably at high temperature and pressure and in the presence of a catalyzer, and the resulting ammonia is withdrawn. The surplus hydrogen which escapes the reaction may then be added to the carbon monoxide and the two gases may be utilized for the purpose of supplying power by burning the gases in a suitable internal combustion engine. This power may be utilized for the purpose of compressing the gases in the separation of the constituents of the water gas and in the synthetic production of ammonia.

With the exception of sodium chloride we now have the necessary materials for conducting the reaction long known and utilized in the Solvay ammonia soda process, but never employed heretofore in combination with the steps as hereinbefore recited and for the production of ammonium chloride and sodium carbonate to be utilized as such. The sodium chloride is readily obtainable and may be dissolved in an ammoniacal solution supplied by synthesis or liquid ammonia may be added to brine or a solution of sodium chloride in suitable proportions and at a suitable temperature. A current of carbon dioxide which has been recovered as above described from the water gas, is directed preferably under pressure into the cold solution for the purpose of precipitating sodium bicarbonate while ammonium chloride remains in solution. The ammonium chloride obtained by crystallization of this solution would not constitute a product directly utilizable for agricultural purposes on account of the considerable quantity of sodium bicarbonate contained therein. In order to render it utilizable, the liquid, after a suitable concentration has eliminated from it as much sodium bicarbonate as is possible, is subjected to careful neutralization with an acid such as sulfuric or hydrochloric and the ammonium chloride is then crystallized out. Alternately successive partial crystallizations, in which advantage is taken of the lower solubility of the sodium carbonates, may also be employed to obtain an ammonium chloride which is available for agricultural use. The sodium bicarbonate is transformed into neutral carbonate by calcination and the carbon dioxide liberated may be returned and utilized in subsequent operations with that recovered from water gas.

The successive steps of a preferable form of carrying out the process will be readily understood with reference to the drawing which indicates water and carbon combined in a gas producer to provide water gas which is separated through the means indicated above into hydrogen, carbon monoxide, and carbon dioxide. Air is similarly separated to recover nitrogen therefrom and the nitrogen is combined in a suitable converter with hydrogen to produce ammonia synthetically in the presence of a suitable catalyzing agent. The surplus hydrogen remaining uncombined is mixed with the carbon monoxide from the water gas and is utilized in an internal combustion engine for the recovery of power.

The ammonia and sodium chloride in solution are then subjected to the action of carbon dioxide recovered from the water gas with the production of sodium bicarbonate, which is calcined to produce sodium carbonate, and ammonium chloride, which is recovered by evaporation. The carbon dioxide released in calcining the sodium bicarbonate is returned and utilized with the carbon dioxide recovered from the water gas.

As will be apparent from the foregoing, the process defined herein provides for the simple and inexpensive recovery of two valuable materials, namely, ammonium chloride and sodium carbonate from cheap and readily available products such as carbon, water, air and sodium chloride. There are no worthless end products resulting from the operation and necessitating disposal at great expense and inconvenience and the process produces the various reagents as noted, as well as power utilizable in conducting the reactions. These reactions, while previously known as such, have never been combined in the manner and for the purpose described in this application nor has any process been heretofore disclosed whereby ammonium chloride and sodium carbonate may be produced from carbon, water, air and sodium chloride in the manner defined herein.

Various changes may obviously be made in the details of the operation and in the apparatus employed, the apparatus being either such as is already known or may be readily provided by those skilled in the art.

I claim:

1. A process of producing ammonium chloride, consisting in preparing a gas containing hydrogen and carbon dioxide, separating the carbon dioxide from the hydrogen, combining the hydrogen with nitrogen to form ammonia, causing this ammonia and the separated carbon dioxide to react with sodium chloride, and withdrawing as a product of the operation the ammonium chloride formed.

2. A process of producing ammonium chloride, consisting in preparing a gas containing hydrogen, carbon monoxide and carbon dioxide, compressing the gaseous mixture, separating the three gases under pressure, combining the hydrogen with nitrogen to form ammonia, causing this ammonia and the separated carbon dioxide to react with sodium chloride, withdrawing as a product of the operation the ammonium chloride formed, burning the separated carbon monoxide, and utilizing the heat for the development of power consumed in the process.

3. A process of producing ammonium chloride, consisting in manufacturing water gas containing hydrogen and carbon dioxide, compressing and cooling the water gas, thereby separating the carbon dioxide from the hydrogen, combining the compressed hydrogen with nitrogen to form ammonia, causing this ammonia and separated carbon dioxide to react with sodium chloride, and withdrawing as a product of the operation the ammonium chloride formed.

4. A process of producing ammonium chloride, consisting in manufacturing water gas containing hydrogen, carbon monoxide and carbon dioxide, compressing the water gas, successively separating the carbon dioxide and the carbon monoxide from the hydrogen under pressure, combining the compressed hydrogen with nitrogen to form ammonia, causing this ammonia and the separated carbon dioxide to react with sodium chloride, withdrawing as a product of the operation the ammonium chloride formed, burning the separated carbon monoxide, and utilizing the resulting heat for the development of power consumed in the process.

5. A process of producing ammonium chloride, consisting in carrying on the manufacture of water gas to produce carbon dioxide with hydrogen in quantity sufficient for the subsequent synthetic reaction in the presence of nitrogen and with carbon monoxide in sufficient quantity to produce, when supplemented by the hydrogen which escapes this reaction, the motive power necessary for the process, compressing and cooling the gaseous mixture to separate carbon dioxide therefrom, separating the carbon monoxide which is to supply motive power from the residual gas by dissolving under pressure, combining the remaining hydrogen with nitrogen to produce ammonia, combining the ammonia with sodium chloride in the presence of the separated carbon dioxide, and withdrawing as a product of the operation the ammonium chloride formed.

GEORGES CLAUDE.